May 28, 1929.  A. B. ELY  1,714,500
TYPEWRITING MACHINE
Filed April 4, 1925  5 Sheets-Sheet 1
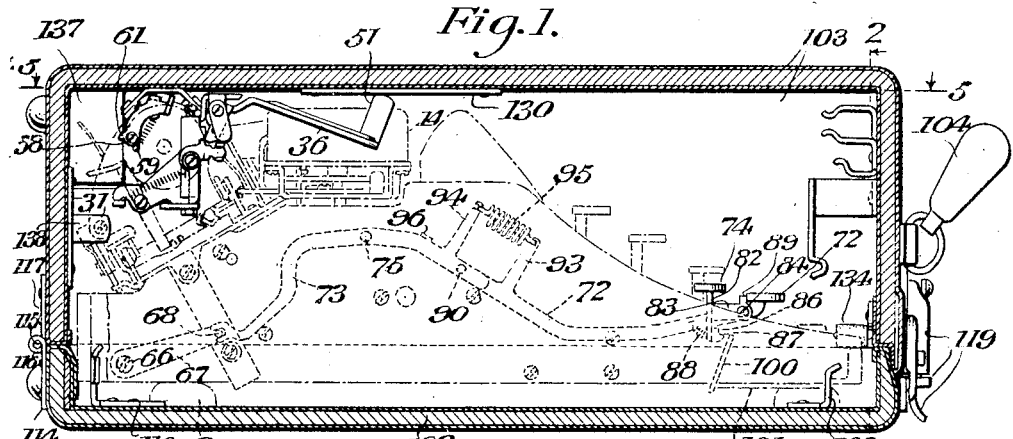
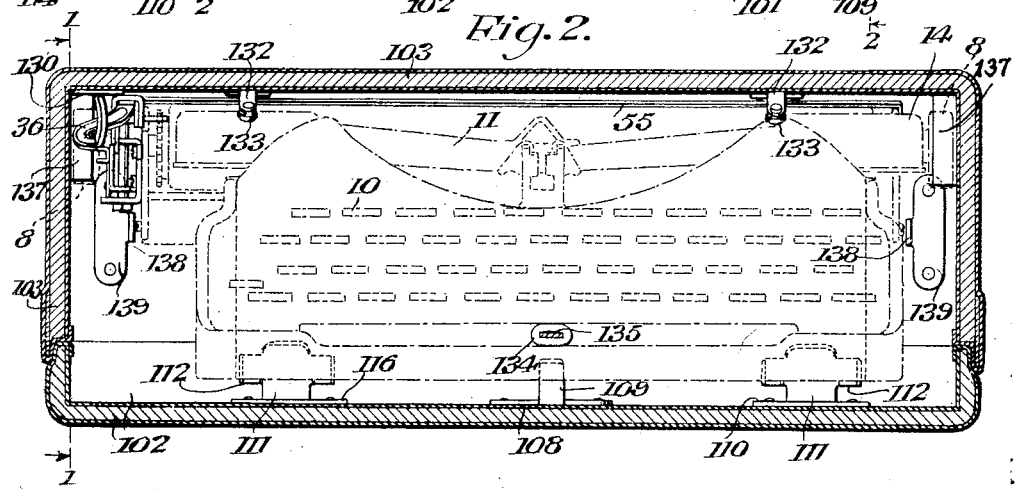
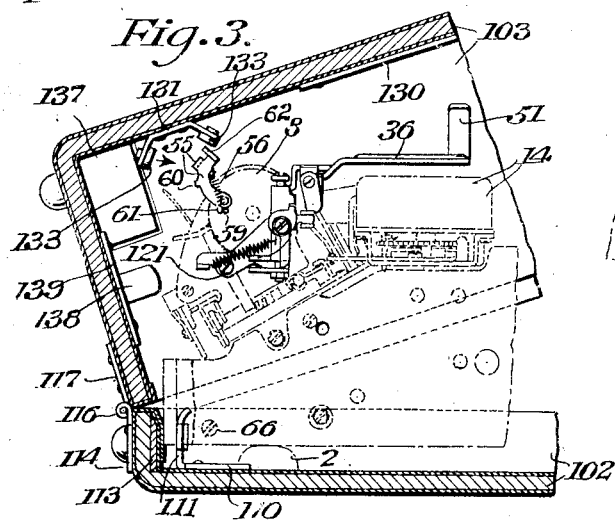
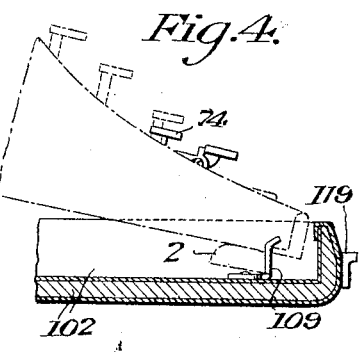
INVENTOR
Alonzo B. Ely
BY
ATTORNEYS

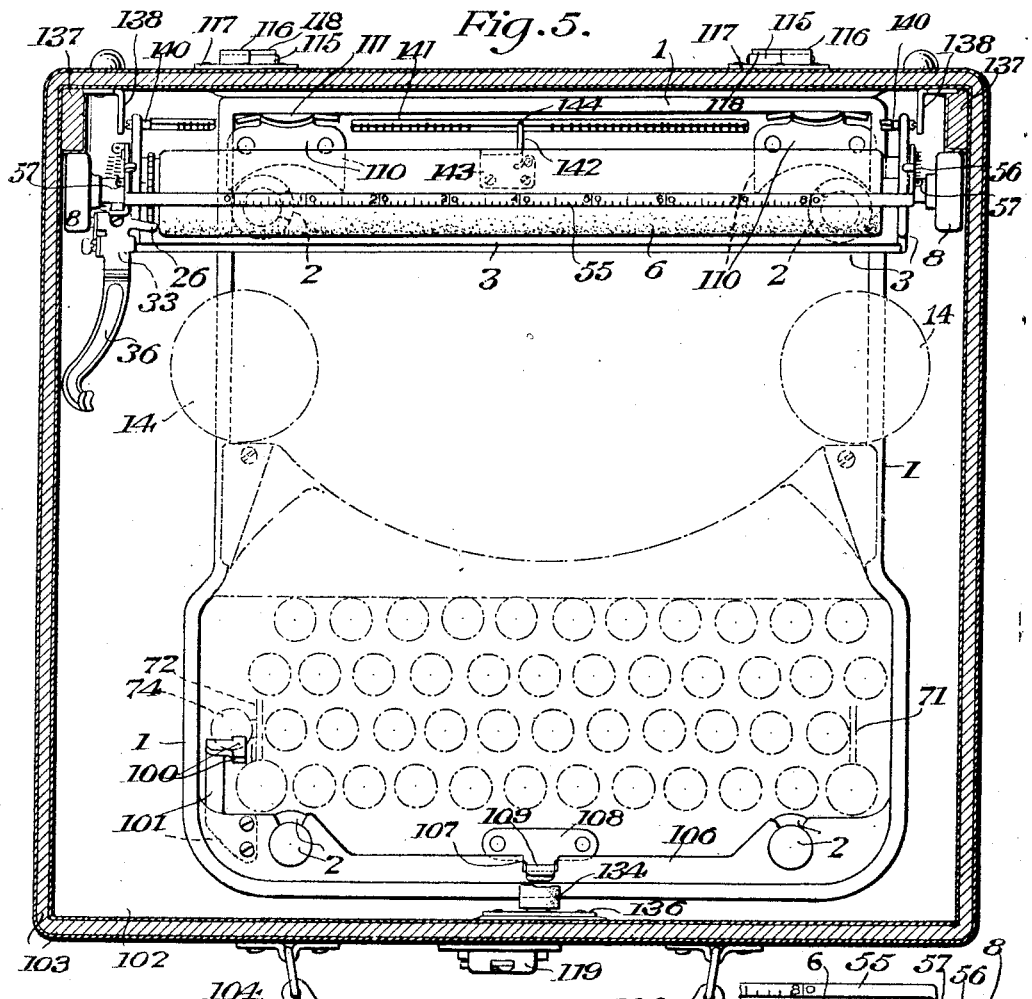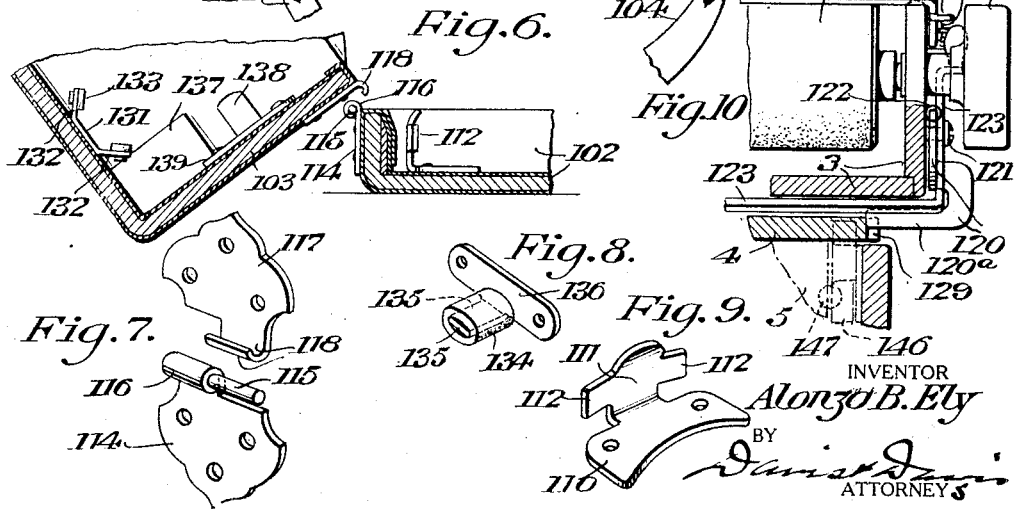

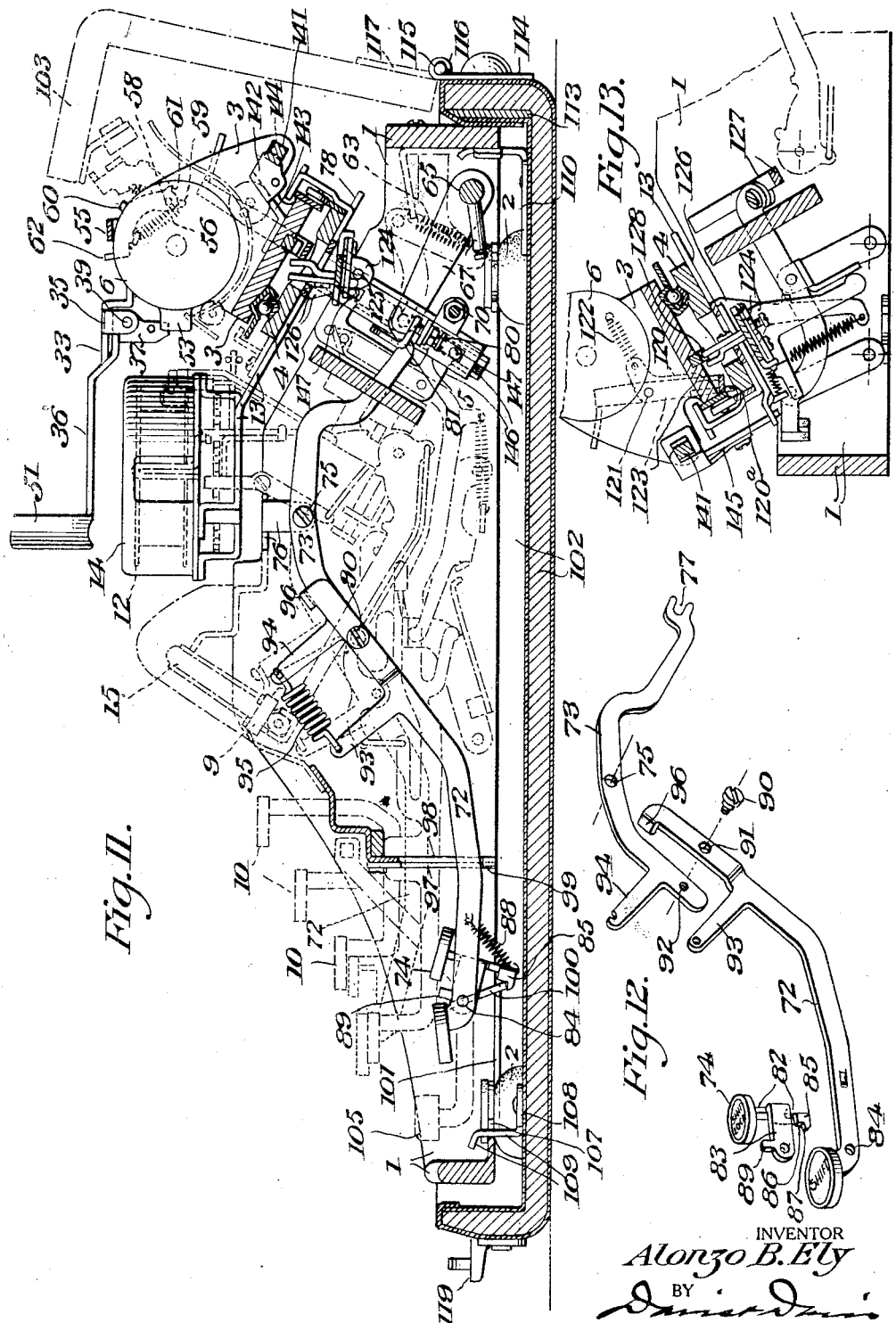

May 28, 1929.  A. B. ELY  1,714,500
TYPEWRITING MACHINE
Filed April 4, 1925  5 Sheets-Sheet 4
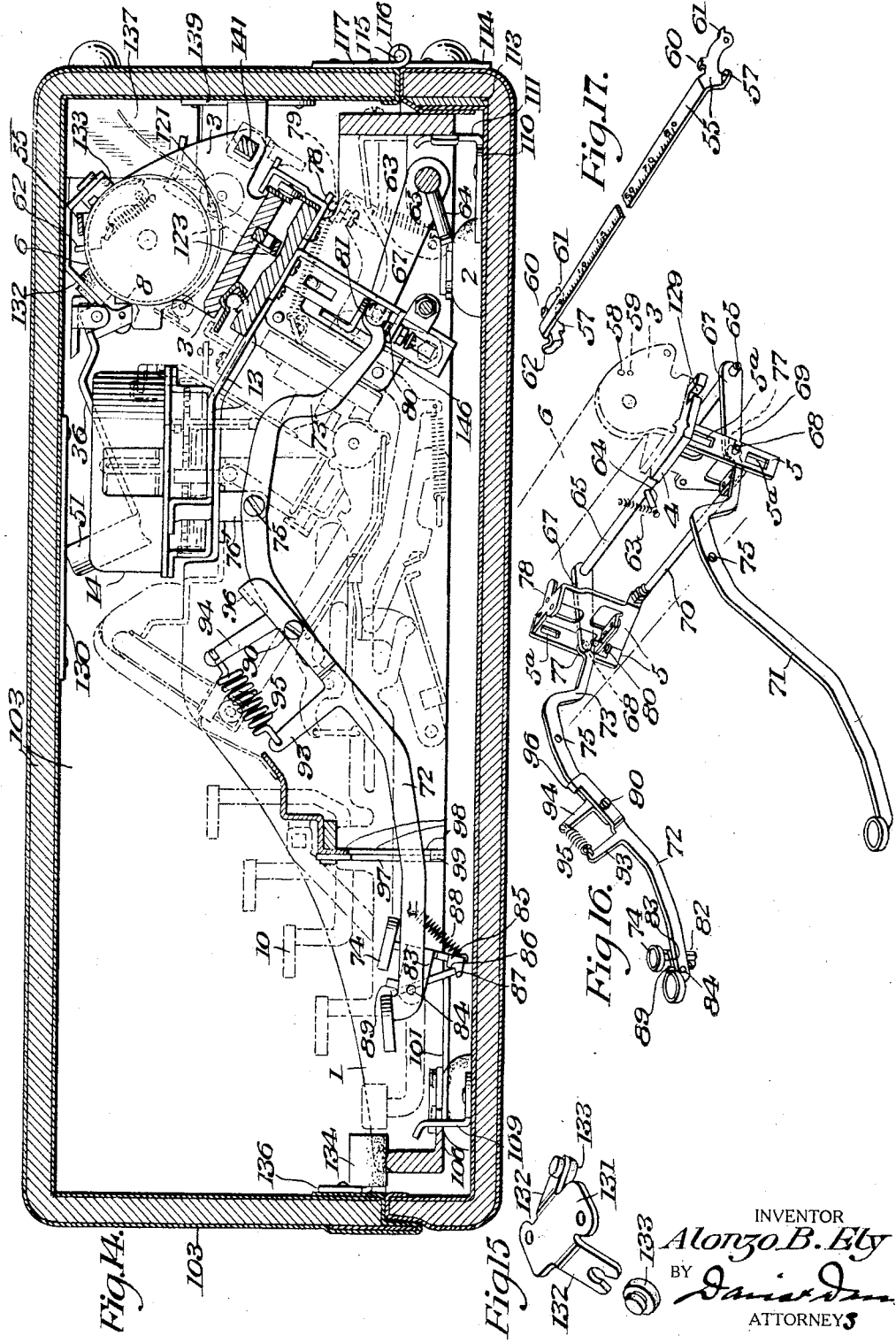
INVENTOR
Alonzo B. Ely
BY
ATTORNEYS

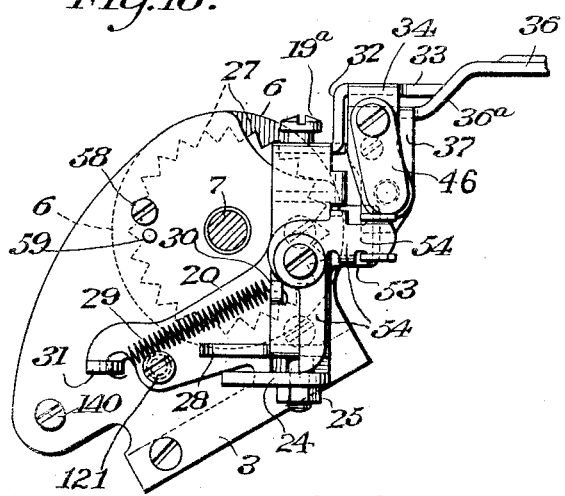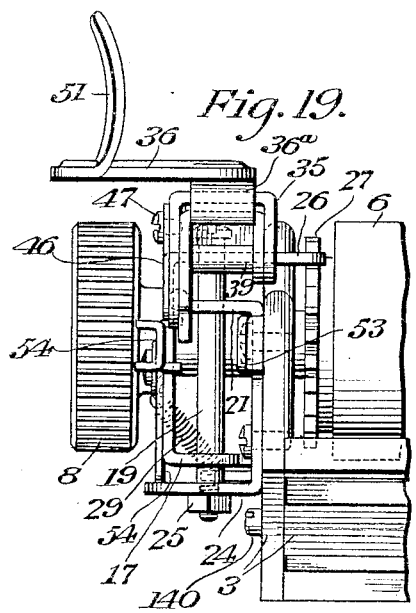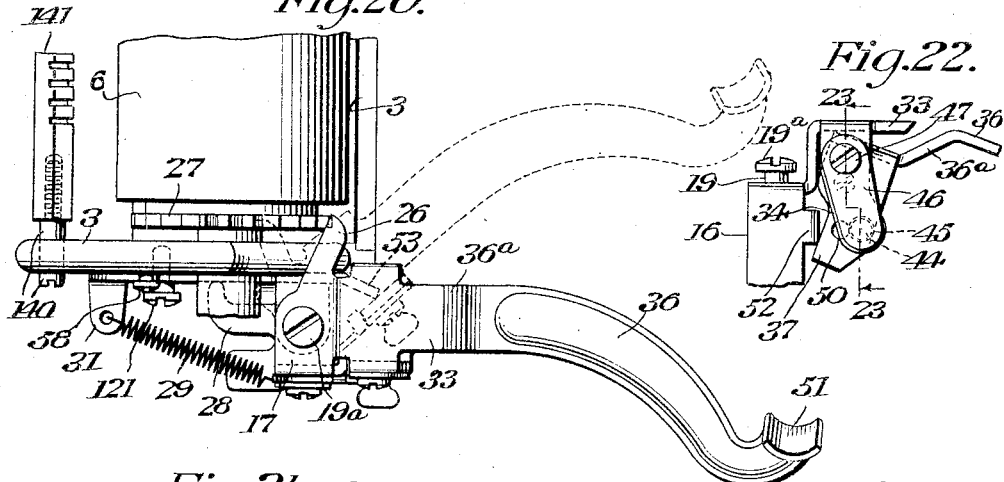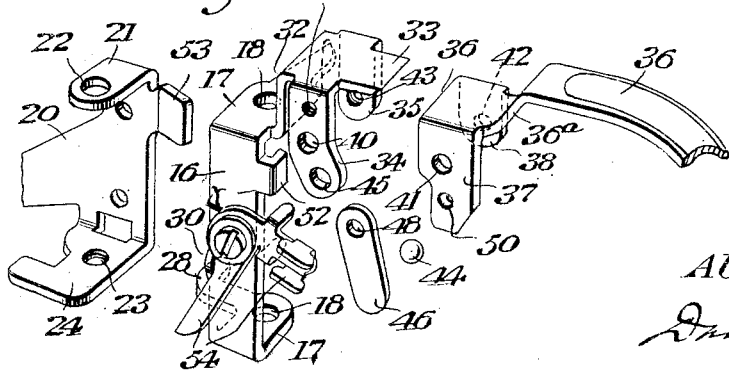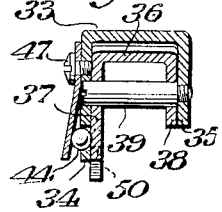

Patented May 28, 1929.

1,714,500

UNITED STATES PATENT OFFICE.

ALONZO B. ELY, OF GROTON, NEW YORK, ASSIGNOR, BY MESNE ASSIGNMENTS, TO L C SMITH & CORONA TYPEWRITERS INC., OF SYRACUSE, NEW YORK, A CORPORATION OF NEW YORK.

TYPEWRITING MACHINE.

Application filed April 4, 1925. Serial No. 20,715.

This invention relates to improvements in typewriting machines, and more particularly to encased portable typewriting machines.

The invention has for its principal objects to provide a typewriting machine having an outer enclosing casing adapted to serve as a carrying case, said casing having a removable cover section and a second or base-board section detachably held to the main frame of the machine, the machine and enclosing casing being so constructed that the machine may be operated either with the cover section removed or the entire outer casing detached from the machine; to provide a portable typewriting machine having ribbon spools located forward of and substantially level with the platen and a horizontally swinging line-spacing and carriage-returning lever mounted on the platen carriage provided with a forwardly extending section arranged to travel over one of said spools and formed with a fixed upstanding finger piece at its forward end, said forwardly extending section of the lever being collapsible downwardly at one side of the spool over which it travels to reduce the height of the machine; to provide a portable typewriting machine having a main framework provided with cushion feet and a flat bottom detachable base member provided with means engageable with the main framework to hold the same in fixed relation thereto with the cushion feet resting on the upper face of the base member; to provide an encased portable typewriting machine in which the operating parts and the enclosing casing are so constructed and arranged as to practically preclude any possibility of injury to the machine either in closing the case or during transportation of the encased machine; to provide an encased typewriting machine having a shifting platen and a shift-lock mechanism constructed to permit movement of the platen automatically to lower case position by a part of the enclosing case when the case is closed about the machine; to provide a novel construction of collapsible line-spacing lever having a part movable to reduce the cubical dimensions of the machine either by the hand of an operator or by the machine cover; to provide an encased portable typewriting machine wherein means are provided for holding the platen carriage against traveling and case-shifting movements; to provide a portable typewriting machine having a shifting platen and a shiftable paper holder both movable to normal position by the cover member of a carrying case to permit enclosure of the machine within the case; to provide an encased typewriting machine having a paper bail movable to release position and having a collapsible line-space lever and a collapsible platen shifting and locking mechanism, wherein the enclosing case is provided with means for collapsing said line space lever and platen shifting mechanism and restoring the paper bail to normal position to permit closure of the case; and to provide a platen shifting and locking mechanism for encased typewriting machines so constructed that the platen may be forced from upper to lower case position by a closing movement of the cover member of the case without injury to the machine without releasing the shift lock. Other objects and advantages will appear from the following description of the improvements in detail.

In the drawings:

Fig. 1 is a vertical section on the line 1—1 of Fig. 2 showing the outer casing closed about the machine, the shift lock being released;

Fig. 2 a vertical section on the line 2—2 of Fig. 1;

Fig. 3 a fragmentary view showing the cover section swung partly down over the machine, the platen carriage being shown in normal lower case position and the paper-holding bail being shown in release position;

Fig. 4 a fragmentary view showing the manner of effecting connection and disconnection of the main frame supporting the working parts of the machine and the base section of the enclosing case;

Fig. 5 a horizontal section on the line 5—5 of Fig. 1;

Fig. 6 a detail sectional view showing the manner of detaching the hinged cover section from the base section of the case;

Fig. 7 a detail perspective view of the parts of one of the separable hinges for the cover section;

Fig. 8 a perspective view of the abutment device on the cover section which engages the front cross-bar of the machine frame;

Fig. 9 a perspective view of one of the rear frame bar-engaging members on the base section of the case;

Fig. 10 a detail view partly in front elevation and partly in section showing the escapement releasing and carriage positioning means in active position;

Fig. 11 a vertical section on the fore and aft center line of the machine, the platen carriage being shown positioned lengthwise of its travel for closure of the case with the escapement devices locked in release position and the carriage locked in upper case position;

Fig. 12 a perspective view showing the parts of the jointed shift lever detached;

Fig. 13 a fragmentary vertical section on the fore and aft center line of the machine, the escapement mechanism and the releasing means therefor being shown in normal position;

Fig. 14 a vertical section similar to Fig. 11 showing the cover section in closed position and the shift key lever collapsed with the shift lock in locking position;

Fig. 15 a perspective view of one of the cushioned platen-engaging devices on the cover section of the case;

Fig. 16 a perspective view of the case shift mechanism;

Fig. 17 a perspective view of the paper holding bail;

Fig. 18 a side view of the line spacing device;

Fig. 19 a front view of the line spacing device;

Fig. 20 a plan view of the line spacing device;

Fig. 21 a perspective view showing the parts of the collapsible line space device and its supporting bracket separated;

Fig. 22 a detail view showing the handle section of the line space lever in collapsed position; and Fig. 23 a section on the line 23—23 of Fig. 22.

Only so much of the typewriting machine as is necessary for a clear understanding of the present improvements has been shown. The main frame 1 of the machine is of general rectangular form in plan view and four rubber supporting feet 2 are secured to said frame adjacent the four corners thereof and extend downwardly below the bottom thereof. The platen carriage 3 is supported on suitable anti-friction bearings, as shown, to travel transversely of the machine on an upwardly and rearwardly shiftable support including a carriage bed 4 and a pair of depending guide brackets 5 rigidly secured to the bed. This shifting support is guided on the main frame, in the machine shown, by anti-friction supporting and guiding means to shift diagonally in a plane at right angles to the plane of the carriage bed from the position shown in Fig. 14 to the position shown in Fig. 11. This supporting and guiding means comprises race members 146 fixed to the main frame and anti-friction balls 147 traveling in channels in said members and in complementary slot-like races 5ª in brackets 5. A platen 6 has its shaft 7 journaled in the end plates of the carriage and extending therethrough, finger wheels or platen knobs 8 being fixed on the ends of the shaft. The printing instrumentalities are mounted in the main frame and include type bars 9 operable by key levers 10 through suitable intermediate connections. The ink ribbon 11 is attached to ribbon spools 12 journaled on brackets 13 rigidly secured to the carriage bed 4. The ribbon spools are housed in cups 14 mounted on brackets 13, and are located on opposite sides of the machine forward of and substantially in the same horizontal plane as the platen 6. Suitable means are provided for feeding and vibrating the ribbon, part of which is indicated in dotted lines in the drawings.

It is highly desirable in a typewriting machine to have a line spacing lever of rugged construction and ample size and to so mount the same that it will have a line spacing movement in the general direction of the return movement of the carriage, and also to so mount the lever that it may be readily actuated to impart a line spacing movement to the platen and a return movement to the platen carriage without the operator's hand coming in contact with any part of the machine. As the platen 6 is located at a low level and at the extreme rear of the machine and travels back of the spools and their cups, and as the heads of the type bars 9 are supported in an inclined type rest 15 the ends of which are practically as high as the spools, the handle part of the line spacing lever must be located at a level substantially higher than any other part of the machine to secure the desired advantages. In order that the machine may be enclosed within an outer casing or carrying case of minimum dimensions I have provided a collapsible line spacing lever.

The line spacing lever comprises a vertically disposed fulcrum section 16 stamped from sheet metal and formed superposed laterally extending ears 17 provided with bearing apertures 18 through which extends a pivot post 19. Post 19 is rigidly secured to a bracket 20 fixed to the outer face of the left hand end plate of the platen carriage 3. Bracket 20 is provided with an outwardly extending ear 21 having an aperture 22 down through which post 19 extends, the lower end of the post, which is of reduced diameter and provided with screw threads, passing through a small threaded aperture 23 in an ear 24 on bracket 20. The post is rigidly but detachably held in place by clamping nut 25 screwed on the reduced lower end of the post tightly up against the under face of the ear 24. Ears 17 of lever section 16 straddle the ear 21 of bracket 20 and swing horizontally about and slide vertically on the post 19 during line-spacing operations of the lever. A line-spacing pawl 26 is formed integrally with the uppermost ear 17 of the lever section 16 and extends inwardly therefrom in a horizontal plane in front of and above the axis of the line-space ratchet wheel 27 which is rigidly held to rotate with the platen. Rotary movement of the lever section 16 in one direction is limited by a stop finger 28 formed on the lower ear 17 and normally held against the outer face of bracket 20 by a return spring 29 secured at one end to an ear 30 stamped from section 16 and extending downwardly and rearwardly therefrom and anchored to an ear 31 formed on the rear end of said bracket. A web 32 extends upwardly from the forward edge of the uppermost ear 17 and is formed at its upper end with a relatively short forwardly extending lever arm section 33 disposed in a horizontal plane above the plane of the top faces of the ribbon spool cups 14. The lever arm section 33 is formed intermediate its ends on opposite sides thereof with two depending ears 34 and 35 spaced apart transversely of the machine.

The foldable lever arm section 36 extends forwardly from the lever arm section 33 and the major portion thereof is preferably disposed in a horizontal plane higher than the plane of section 33, the rear end of section 36 being bent downwardly and rearwardly and extending under section 33 and provided at one edge thereof with a depending ear 37 abutting against the inner face of ear 34 and provided at its other edge with a depending ear 38 abutting against the inner face of ear 35. A horizontal pivot pin 39 having a screw driver receiving notch in its outer end, as shown in Fig. 23, extends inwardly transversely of the machine through the registering apertures 40, 41 and 42 in ears 34, 37 and 38 and has a reduced screw threaded inner end screwed into a threaded aperture 43 in ear 35. The forward end of lever section 33 is preferably beveled downwardly and rearwardly as shown and co-operates with the downwardly and rearwardly inclined portion 36ª of lever arm section 36 to arrest upward swinging movement of the section 36 when the major portion of said section reaches a horizontal position.

The lever section 36 is locked in its normal horizontal position by means of a spring latch or detent device so constructed that said section may be folded downwardly when desired simply by exerting a substantial downward pressure thereon. This locking or detent device comprises a steel ball 44 loosely seated in an aperture 45 in ear 34 carried by the lever section 33. The ball 44 is of less diameter than the aperture 45 and is normally pressed inwardly by the free lower end of a stiff flat steel spring 46, the upper end of which is rigidly clamped against the outer face of ear 34 by a clamping screw 47 passed through an aperture 48 in the upper end of the spring and screwed into a threaded aperture 49 in ear 34. The ear 37 of section 36 is provided with an aperture 50 of less diameter than the ball 44 and into which said ball is partly thrust by the strong spring 46 when the inclined portion 36ª of lever section 36 is rocked upwardly against the forward beveled end of lever section 33 to thereby latch the two lever sections firmly together in their normal operative extended relation. The lever section 36 is provided with an upstanding finger-piece or handle 51 at its forward end, and said section and finger-piece are foldable downwardly below the plane of the lever section 33 to a compact position outside of the left hand ribbon spool cup 14 with the highest parts thereof substantially at the level of the highest points of the platen and spool cups, when the platen carriage is positioned as hereinafter described, to permit enclosure of the machine within its carrying case. The downward movement of the lever section 36 is limited by the engagement of the rear edge of the ear 37 thereon with a stop lug 52 extending inwardly from the fulcrum section 16 of the line-space lever. In the collapsed position of the lever section 36 the ball 44 is pressed tightly against the outer face of ear 37 forward of the aperture 50, as shown in Fig. 22, this tight frictional engagement of the ball and ear serving to hold the folding lever section in compact position.

The line-spacing operation of the collapsible line spacing lever and the pawl 26 is briefly as follows: With the parts in the position shown in Figs. 18, 19 and 20, the handle 51 is swung toward the right causing the lever to swing about the pivot post 19 until pawl 26 engages a tooth of the ratchet wheel 27, whereupon the continued swinging movement of the handle in the same direction imparts a simultaneous rotary and vertical sliding motion to the lever relatively to post 19 until the swinging movement of the lever is arrested by engagement of the inner face of the ear 37 with an outwardly and forwardly extending stop lug 52 formed on the bracket 20. The post 19 is formed with a head 19ª for arresting the vertical movement of the lever on the post when ear 37 engages stop 53. The lever may be set for rotating the ratchet wheel for single and double spacing, respectively, by shifting the line-space regulating lever 54 either to the position shown in Figs. 18, 19 and 20, in which the regulating lever arrests a downward movement of the sliding and swinging lever section 16 with the lower ear 17 out of contact with ear 24 of bracket 20, or by adjusting the regulating lever to the position shown in Fig. 21 to permit the lower ear 17 of the lever section 16 to normally rest on the ear 24.

The transverse bar of a paper-holding bail 55 is normally held close to the top of the platen by a pair of coil springs 56 connected to ears 57 projecting outwardly from the side arms of the bail, said arms extending downward and rearward at the outer sides of the end plates of the platen carriage to which they are connected by pivots 58. Springs 56 extend downward and rearward from ears 57 and are attached at their lower ends to studs 59 projecting from the carriage end plates below pivot screws 58. The normal position of bail 55 is determined by engagement of stop lugs 60 with the edges of the carriage end plates, said lugs projecting inwardly from the side arms of the bail. The release position of the bail is determined by the engagement of stop lugs 61 on its side arms with the spring anchor studs 59, the bail being shown in release position in Fig. 3 and in dotted lines in Fig. 11. In release position the springs 56 extend in straight lines from studs 59 to ears 57 either across, or preferably as shown, very slightly back of the pivotal axis of the bail, so that the bail will remain in release position after being pushed there but will snap back to normal under a slight forward push or pull. The left hand side arm of the bail extends forward of the cross bar and is formed with a laterally bent finger piece 62 which projects upward above said side arm. In release position parts of the bail, and especially finger piece 62, are higher than when in normal position and some portions thereof are higher than any other part of the machine except the collapsible part of the line space lever. The cross-bar of the bail is preferably provided with a letter-space scale, as shown.

The shift frame is guided by two pairs of anti-friction balls 147 engaging in raceway slots 5ª in brackets 5 and traveling in channels extending parallel with said slots at right angles to the plane of the carriage bed and formed in brackets 146. The weight of the shiftable frame and parts thereon is partly counter-balanced by a spring 63 connected with a bracket on the main frame and with a central arm 64 held to a rock shaft 65 journaled on bearing screws 66 tapped through the side walls of the main frame. A pair of rock arms 67 extend upward and forward from the shaft, and pins 68 extend outward from the forward ends of said arms through slots or notches 69 in brackets 5 which are connected at their lower ends by a rod 70. A rigid temporary shift key lever 71, and a collapsible shift-key lever 72—73 carrying also a shift lock key 74, are fulcrumed at opposite sides of the machine on transverse pivot screws 75 held to brackets 76, fixed on the main frame 1, the fulcrums of the levers being close to the top of the main frame and each lever being of general arch form and having a downwardly and rearwardly extending arm provided with a fork 77 embracing one of the pins 68 on rock arms 67 and also having a downwardly and forwardly extending arm carrying a shift key at its forward end.

In the normal lower case position of the shift frame the stop lugs 78 on brackets 5 rest on top of a pair of lower-case stop screws 79 supported on the main frame. When either shift key is depressed the shift frame and parts thereon move upward and rearward until the upper ends of shift stop screws 80 on brackets 5 engage upper case stops 81 fixed on the main frame. The shift lock key 74 is mounted on a normally vertical stem 82 having a forwardly extending arm 83 pivoted at 84 to the key lever 72—73 and also having at its lower end a forwardly extending locking lug 85 having a vertical forward edge portion 86 and an edge portion 87 extending downwardly and forwardly from the lower end of the edge portion 86. Stem 82 is normally held upright by a light return spring 88 extending upwardly and rearwardly from the lower end of the stem and secured at its upper end to key lever 72—73, a stop lug 89 on arm 83 normally engaging the rear edge of the shift key on lever 72—73.

The two sections 72—73 of the left hand shift key lever are connected by a downwardly breaking knuckle joint which is preferably located forward of the fulcrum 75 of the lever in the downwardly and forwardly inclined portion of the lever, as shown. The rear portion of section 72 is laterally offset and the forward and downward extending portion of section 73 abuts against the offset portion of section 72 in line with the main portion of section 72, the overlapping portions being connected by a shouldered pivot screw 90 the bearing portion of the shank of which extends loosely through an aperture 91 in section 72 and the reduced threaded shank portion of which is screwed into a threaded aperture 92 in section 73. The two sections of the lever are formed with upstanding arms 93—94 at opposite sides of pivot 90, the upper ends of which are connected by a normally tensioned strong or stiff coiled spring 95 of relatively large gauge spring wire which normally holds the two lever sections in the positions shown in Figs. 1 and 16 with the laterally bent lug 96 on the upper edge of section 72 engaged firmly against the upper edge of section 73 back of the pivot 90 of the knuckle joint. Said spring is of such force or tension that it will not yield to permit separation of lug 96 from the upper edge of section 73, when lever 72—73 is actuated by either of the keys thereon, during movement of the platen support between case positions, but will yield when subjected to pressure or load in excess of any load imposed thereon in shifting the movable parts, such as excess pressure on said keys after engagement of upper case stops 80—81 or pressure from the enclosing case cover when the case is closed with the platen carriage locked up.

A stop bar 97 secured to the key lever comb 98 of the machine is provided with a laterally extending stop lug 99 adapted to be engaged by the lower edge of section 72 to arrest downward movement thereof following a slight continued depression of said section after stops 80—81 engage each other. A similarly arranged stop is preferably provided for the lever 71. Continued pressure on either key on lever 72—73 or the key on lever 71, after the platen reaches upper case position, will cause the forward part of either lever to engage the fixed stops 99 to prevent injurious straining of the parts of the shift mechanism. In the case of lever 71 this slight additional movement (usually about $\frac{1}{32}$ inch) is permitted by a temporary springing of the lever, and in the case of lever 72—73 by a slight stretching of spring 95 permitting lug 96 to separate very slightly from lever section 73. This slight folding movement of the key carrying arm of lever 72—73 is also utilized to permit engagement of the shift lock 85 under lock plate 100. When the right and left hand shift levers are in normal position their upper edges are spaced below the upper ends of their guide slots in comb 98 as shown in dotted lines in Fig. 11, so that both levers are free at their forward ends. Spring 95 can not therefore normally lift the shift frame off the lower case stops.

When the shift lock key is depressed the lock lug 85 on its stem rides down the rear face of an inclined lock plate 100 formed on a bracket 101 secured to the main frame 1 and, upon the slight folding movement of the lever arm section 72 after engagement of stops 80—81, snaps under the lower downwardly and forwardly inclined edge of the plate, the spring 95 thereupon very slightly contracting as the inclined edge portion 87 of the lug passes slightly upward in front of the front face of the plate (as shown in Fig. 11), thus providing a very secure shift lock. The pivot 90 of the lever joint is preferably disposed sufficiently below a line passing through pivot 84 of the shift lock key stem and fulcrum 75 of the key lever 72—73, as shown in Figs. 1 and 11, so that when the platen carriage is forced down to lower case position with the shift lock on (as shown in Fig. 14) the joint will break and pivot 90 will move slightly upward and forward to a point on said line, the collapsible lever slightly increasing in length and pivot 84 moving slightly forward and downward and inclined edge 87 of lock lug 85 rocking flush up under the lower edge of plate 100 on bracket 101. Any possibility of kicking off of the lock when the lever is collapsed is thus prevented, thereby avoiding any undesirable shocks or strains on the parts of the machine. When the abnormal pressure on the shift frame is relieved the parts will return to the positions occupied thereby in Fig. 11.

An outer enclosing casing is provided for the machine, said casing comprising a base section 102 and a cover section 103 adapted to completely enclose the machine, the cover section of said casing being provided at one end with a suitable handle 104 so that said casing may be employed as a carrying case for transporting the machine. The base section of the case is so constructed as to form a baseboard to which the main frame of the machine is detachably held and which is adapted to support the machine in condition for use upon the lap of an operator or any uneven surfaces. Said base section comprises a flat bottom plate provided with low upstanding edge flanges terminating below the level of the various keys and the space bar 105 in the keyboard of the machine and below the path of travel of the carriage.

The front cross bar of the main frame 1 of the machine is provided with a horizontal rearwardly extending flange 106 provided with a centrally disposed notch 107 in its rear edge. A bracket 108 rigidly secured to the upper face of the base section is provided with an upstanding arm 109 engaged in said notch and having its upper end extending forwardly and upwardly above the flange 106 forward of the inner or front end of the notch. A pair of transversely spaced brackets 110, rigidly secured to the upper face of the base section adjacent its rear edge, are provided with upstanding arms 111, said arms having their upper ends bent slightly forwardly and upwardly and also being provided with ears 112 on opposite sides thereof bent forwardly. The arm 109 on bracket 108 and the arms 111 on brackets 110 are so spaced apart fore-and-aft of the machine that, when the front cross bar of the machine is passed downwardly (as shown in Fig. 4) to engage arm 109 in notch 107 of the flange 106, and the rear end of the machine is lowered, the rear cross bar of the main frame 1 may be forced down over the forwardly bent arms 111 until the rubber feet 2 rest upon the upper surface of the base section with the forward edge of notch 107 in firm engagement with front face of arm 109 and the front face of the rear cross bar of the main frame in firm engagement with the rear faces of arms 111. The outermost ears 112 of the arms 111 preferably extend close to the inner faces of the side walls of the main frame 1 of the machine. The bending of the arm 109 prevents accidental separation of the front cross bar from the arm if the front end of the baseboard is tilted upwardly, and the bending of the ears 112 and the upper ends of the arms 111 facilitates the forcing down of the main frame thereover. Brackets 108 and 110 are stamped from sheet metal and the arms thereof are slightly resilient.

The detachable holding means just described prevents accidental relative movement between the base case section and the main frame of the machine and permits the same to be readily connected and disconnected when desired. The sections of the casing may be formed of any suitable material and are preferably covered at the inner and outer sides thereof with thin layers of finishing material, as shown. A sheet of straw board 113, or other suitable cushioning material, is preferably provided at the inner face of the rear upstanding flange of the base casing section inside of the lining of finishing material, this covered cushion 113 and the arms 111 being spaced a distance equal to or slightly less than the thickness of the rear cross bar of the main frame 1 so that said cross bar will be firmly frictionally gripped on both its front and rear faces.

The rear flange of the base section is provided with a pair of transversely spaced hinge leaves 114 to which are rigidly secured inwardly extending hinge pintles 115 the outer ends of which are anchored in tubular sockets 116 formed by rolling outwardly and downwardly and inwardly an upward extension of the main body portion of each leaf. A pair of hinge leaves 117 are rigidly secured to the rear wall of the cover section 103 of the case and are provided at their lower edges with semi-cylindrical or upwardly facing hook-like bearing lugs 118 engaging under the pintles 115 when the cover is closed and adapted to swing about said pintles when the cover is opened. When the cover is rocked upwardly and rearwardly beyond a perpendicular position the hinge leaves may be readily disconnected by a slight forward movement of the upwardly tilted cover, as shown in Fig. 6, to disconnect the cover section from the base section. The front flange of the base section and the front wall of the cover section are provided with co-operating members of a suitable hasp lock 119 for locking the case sections together when the case is closed.

When the platen carriage is in normal lower case position the parts 36 and 51 of the line spacing lever are at higher levels above the baseboard than the distance between said baseboard and the top of the cover when the case is closed and must therefore be lowered before the case can be fully closed. When the paper bail 55 is in release position a portion thereof is also at such a high level that the bail must be restored to normal position before the cover can be fully closed. When the platen carriage is locked in upper case position, as shown in Fig. 11, not only the before mentioned parts, but certain other parts of the machine including the line space lever section 33, are at such a high level that the carriage must be lowered before the cover can be fully closed. It is also necessary to position the carriage at a predetermined point intermediate the limit of its letter space travel before the cover may be closed as the cover is only very slightly wider than the distance between the outer ends of the two platen knobs 8.

The carriage is positioned for closing the cover by swinging forwardly a carriage positioning and locking lever 120 pivoted at its upper end on a screw 121 extending outwardly from the right hand plate of the platen carriage and normally rocked rearwardly by a spring 122 against a suitable stop, not shown. A portion of the lever 120 extends behind an escapement releasing bail 123 also fulcrumed on the screw 121 at the right hand end of the carriage and fulcrumed on a similar screw at the other end of the carriage. The cross bar of the bail 123 extends between the base plate of the platen carriage 3 and the carriage bed 4 back of the escapement dogs which are mounted on a dog rocker 124 pivoted at 125 on a suitable bracket 126 depending from the carriage bed and operated from a universal bar 127 actuated by the type bars. When the lever 120 is rocked forwardly it carries the bail forwardly from the position shown in Fig. 13 to the position shown in Fig. 11 so as to rock both dogs of the escapement out of engagement with and forwardly of the escapement rack 128 secured to the under side of the base plate of the carriage, whereupon the carriage is moved toward the left until the inwardly extending lower end 120$^a$ of lever 120 engages in notch 129 formed in the right hand end of the carriage bed 4. The length of the lever arm 120$^a$ is such that when it is engaged in the notch 129 the carriage overhangs the left hand side of the machine slightly more than it overhangs the right hand side thus providing ample clearance for downward movement of the collapsible section of the line-spacing lever at the left hand side of the left hand ribbon spool. The notch 129 prevents return movement of the lever 120 until the carriage is again moved toward the right, thereby holding the escapement dog releasing bail in release position while the carriage is positioned for enclosure of the machine within the case.

When the machine is mounted on the base member 102 and the carriage has been positioned for closure of the cover member 103 as above described, said cover member, if disconnected, may be attached to the base member by passing the hook-like parts 118 of the hinge leaves 117 downwardly and rearwardly under pintles 115, whereupon the case may be closed by swinging the cover forwardly and downwardly and the case sections may then be locked together by the lock 119. If the carriage is in lower case position and the paper bail in normal position when the cover is thus closed, the only parts of the machine obstructing closure of the cover are the collapsible portions 36—51 of the line space lever. A wear plate 130 secured to the under face of the cover engage the upper end of the finger piece 51 on the line-space lever section 36 as the cover is swung down to closed position and forces detent ball 44 out of socket 50 and rocks portions 36—51 from the positions shown in Figs. 3, 18, 19 and 20 to the more compact positions of said parts shown in Figs. 1, 2, 22 and 23. Ball 44 in the last-mentioned position of the parts is pressed tightly against ear 37, as shown in Figs. 22 and 23 and frictionally holds parts 36—51 in collapsed position after opening of the case until they are pulled upward to normal position by the operator. It is, of course, obvious that the line space lever may be collapsed by a direct downward push of the hand of the operator before closing the case, if desired, but if the operator forgets to collapse the lever it will be automatically collapsed through the medium of the cover when the case is closed.

Secured to the under face of the top wall of the case cover are a pair of transversely spaced sheet metal brackets 131 each formed with a pair of oppositely inclined arms 132 one of which extends downward and forward from said cover wall and the other of which extends downward and rearward from said wall. The arms are each provided with rubber cushions or pads 133 which engage the platen roll 6, preferably under compression (as shown more clearly in Fig. 14), at two points fore-and-aft of a vertical line through the platen axis and above a horizontal line through the platen axis, when the cover is closed. These cushions serve to prevent case shift movement of the shift frame and the parts thereon when the case is closed and also resist fore-and-aft movements and tilting movements of the carriage when the machine is being transported.

A third cushion, in the form of a rubber sleeve 134 on the rearwardly extending horizontal arm 135 of an angular bracket 136 secured to the inner face of the front wall of cover 103, is firmly pressed down on top of the front cross-bar of the main frame 1 substantially midway the sides of said frame when the cover is closed and cooperates with the four platen-engaging cushions 133 to prevent movement of the machine toward the top of the case. It will thus be noted that an upper set of cushions 133—134 and a lower set of cushions 2 are interposed between the machine and the case so that the machine is well protected from injurious shocks. The brackets 131 and 136 are formed of sheet metal and the cushion-carrying arms thereof are bendable for purposes of adjustment.

A pair of wooden blocks 137 are secured in the rear upper corners of the case cover and preferably covered with finishing material similar to the inner lining of the case, said blocks swinging upwardly and forwardly to positions behind the platen knobs 8 and in engagement therewith to support the carriage and resist movement thereof toward the rear wall of the cover. The blocks are particularly useful to protect the shift frame brackets 5 and other parts of the guiding and supporting means for the shiftable carriage bed from injury when the case is dropped, the case being usually carried up-ended with the rear end of the machine lowermost.

The carriage positioning and escapement lock-out means are relieved of strain and the carriage is held from traveling movement in either direction along its bed by means of the forwardly extending arms 138 of a pair of angular brackets 139 secured to the inner face of the rear wall of the cover, said arms being spaced transversely so as to embrace the carriage and preferably engaging the outer ends of the reduced bearing portions or trunnions 140 of a rockable margin stop bar 141 journalled in the end plates of the platen carriage 3. The bar 141 is held against endwise movement by a lug 142 on a bracket 143 fixed to the base plate of the carriage and extending partly into a central notch 144 in said bar, as shown more clearly in Fig. 5 and 11. The arms 138 are bendable laterally for purposes of adjustment. The stop bar is rockable to release the margin stops 145 thereon by a lever or rock arm not shown.

If the cover is closed with the platen carriage locked in upper case position by the shift lock device 74—85, as shown in Fig. 11, the line space lever will be collapsed as above described and the platen will be engaged by the cushions 133 and forced downward to lower case position, as shown in Fig. 14, the spring 95 stretching under the abnormal strain and the knuckle joint in shifting and locking lever 72—73 breaking downwardly to permit the shift frame and parts thereon to move downward to normal position without kicking off or releasing the shift lock 74—85 and without imposing injurious strains on any of the parts. When the case is opened the shift frame will again rise as spring 95 contracts until shift stops 80 and 81 engage again.

The construction and arrangement of the parts is such that the rear cushions 133 on the cover will engage behind the cross-bar of the paper bail 55 during closing movement of the cover, if said bail is in release position when the cover is rocked in closing direction, whether the platen carriage is in lower or upper case position and rock said bail to normal paper holding position, as will be apparent from an inspection of Figs. 3 and 11. Injury to the bail by closure of the case while the bail is in release position is thus prevented.

What I claim is:

1. In a portable typewriting machine, a platen carriage and platen shiftable upwardly to change case, a line space device shiftable with the carriage having a downwardly movable handle part normally extending above the plane of the top of the platen, a paper bail pivotally mounted on the carriage and manually shiftable upwardly and rearwardly to an extended release position from a compact paper-holding position in close association with the platen, means for holding the platen and carriage in upwardly shifted position, means for holding the handle part in its normal position, and means for holding the bail in its release position, said several holding means being constructed to permit downward movement of the parts held up thereby either directly by the hand of an operator or by pressure from an enclosing case cover being shifted downward over the machine.

2. A typewriting machine having a jointed line-space lever provided with a handle portion normally extending to a level higher than the remainder of the machine, said machine also having an upwardly shiftable platen and a jointed shift-lock key lever connected and arranged to move the platen upwardly and lock it there, the connections between the parts of said two jointed levers being constructed and arranged so that the higher handle portion of said line-space lever and the platen may be depressed by a cover placed over the machine.

3. In combination, a portable typewriting machine, an attached base case section, a cover case section, means forming a hinge connection between the case sections at the rear of the machine, said machine having an upwardly movable platen shift frame and a shift lock key having a yielding connection with said frame, and means carried by the cover section for engaging the platen of the machine when the cover is closed to either hold the platen and shift frame in normal case position if already there or to both depress the platen and shift frame to and hold the same in normal position if the shift lock key is locked down when the cover is closed.

4. In a portable typewriting machine having a platen shift frame shiftable upwardly to upper case position, a shift lock key, a yielding connection between the said frame and key adapted to maintain said frame and the parts thereon in upper case position and to yield upon application of excessive downward pressure to the shift frame, a line-space device including a pawl and an operating handle partaking of the case shift movement of the platen, said handle extending to a higher level than the platen, means supporting the handle to swing transversely of the machine during the line-spacing operations, a transverse pivot connecting said handle and its supporting means whereby said handle may be shifted downward relatively to the platen shift frame to a position in front of the platen, and a pressure-releasable device for holding said handle in either its raised or lowered position.

5. In combination, a portable typewriting machine, an attached base case section, a cover case section, means forming a hinge connection between the case sections at the rear of the machine, said machine having an upwardly movable platen shift frame and a shift lock key having a yielding connection with said frame, and means carried by the cover section for engaging the platen of the machine when the cover is closed to either hold the platen and shift frame in normal case position if already there or to both depress the platen and shift frame to and hold the same in normal position if the shift lock key is locked down when the cover is closed, said machine having a paper holder shiftable to a release position in which it extends above the level of the platen, said holder being shiftable from release position to normal position by said platen engaging means on the cover.

6. In combination, a portable typewriting machine having a hinged paper-holding bail shiftable upwardly and rearwardly away from the platen and means for holding the bail in upwardly shifted position, a base case section attached to the main frame of the machine, a cover case section, means forming a hinge connection between the case sections at the rear of the machine, and means carried by the cover section for restoring the bail to normal paper-holding position when the case is closed with the bail rocked upward.

7. In combination, a portable typewriting machine having a platen carriage shiftable to change case, a shift-lock key having a yielding connection with said carriage arranged to permit movement of the carriage to normal position independently of the release of said key, a base case section attached to the bottom of the main frame of the machine, and a cover case section movable relatively to the base section to permit operation of the machine and adapted to force the carriage to normal position when the case is closed with the shift-lock key locked down.

8. In combination, a typewriting machine having front and rear main frame bars, said front bar having a vertical notch therein, a main frame base member having a flat portion closing the under side of the machine and provided with means for frictionally gripping the front and rear sides of the rear frame bar, and a hook secured to said base member having a vertical portion engaging in the notch in the front frame bar and a lateral portion overhanging a part of said bar.

9. The combination with a typewriting machine having a main frame, a traveling platen carriage and means for shifting the carriage to change case, of an enclosing case for the machine having two parts connected for opening and closing movements, one part of said case having low edge flanges, means on said flanged part adjacent one edge thereof cooperating with the adjacent edge flange to frictionally grip a part of the main frame of the machine, means adjacent the opposite edge of said flanged part overhanging a part of the main frame of the machine, and means on the other case part for engaging the platen of the machine to hold the carriage against case-shifting movement when the case is closed.

10. The combination with a typewriting machine having a main frame, a traveling platen carriage and means for shifting the carriage to change case, of an enclosing case for the machine having two parts connected for opening and closing movements, one part of said case having low edge flanges, means on said flanged part adjacent one edge thereof cooperating with the adjacent edge flange to frictionally grip a part of the main frame of the machine, means adjacent the opposite edge of said flanged part overhanging a part of the main frame of the machine, means on the other case part positioned by closure of the case to prevent traveling movement of the carriage, and means on the last mentioned case part positioned by closure of the case to prevent shifting of the carriage in case-changing direction.

11. The combination with a typewriting machine having a traveling platen carriage and platen shiftable to change case and a downwardly collapsible line-space lever normally extending forwardly at one end of the carriage, of enclosing means therefor adapted to collapse the line space lever and hold the carriage against traveling and case-changing movements, said enclosing means being adapted to be closed about the machine only when the center of the carriage is slightly to one side of the fore and aft center line of the machine with the line-space lever clear of underlying parts of the machine.

12. The combination with a typewriter machine having a traveling platen carriage and platen shiftable to change case and a downwardly collapsible line-space lever normally extending forwardly at one end of the carriage, of enclosing means therefor adapted to collapse the line-space lever and hold the carriage against traveling and case-changing movements, said enclosing means being adapted to be closed about the machine only when the center of the carriage is slightly to one side of the fore and aft center line of the machine with the line-space lever clear of underlying parts of the machine, and means on the machine for positioning the carriage to permit closure of said enclosing means.

13. The combination with a typewriting machine having a platen carriage and platen shiftable to change case, of means for holding the carriage and platen in upper case position comprising a jointed shift lock lever, a spring connecting the parts of said lever, enclosing means for the machine adapted to fit about the machine only when the carriage and platen are in lower case position, and a cushioned pressure device carried by said enclosing means adapted to engage the platen roller to hold the platen and carriage in lower case position, said device moving during closure of the enclosing means in a direction to engage the platen roller and force the carriage and platen to lower case position against the resistance of said spring when the enclosing means is closed with the shift lock lever in locked position.

14. In a portable typewriting machine having a platen shifting frame, the combination of a shift key lever pivotally connected at one end with the shift frame, means pivotally supporting said key lever intermediate its key and connection with the shift frame, one arm of said lever being divided into two parts, means pivotally connecting said parts of the lever arm, a spring connecting said parts of the lever arm, a shift-lock key carried by said key lever forward of the joint in said two-part arm, and locking means under control of said shift-lock key for locking the key-carrying end of said shift key lever in depressed position, said spring and pivotal connection between the parts of the jointed lever arm being arranged to permit movement of the platen to lower case position against the resistance of said spring by pressure transmitted to the shift frame from part of an enclosing case for the machine when the case is closed with the shift-lock key in locking position.

15. A typewriting machine having a collapsible line-space lever comprising two pivotally connected parts and a ball-and-socket lock device for holding the parts of the lever in normal extended relation.

16. A collapsible line spacing lever comprising a fulcrum section and a handle section, said fulcrum section having a bearing for a vertical pivot, means pivotally connecting the adjacent ends of said lever sections to permit up and down movements of the handle section, a pair of stops carried by the fulcrum section for limiting up and down movements of the handle section, a ball detent supported in the fulcrum section, said handle section having a socket in which said ball is adapted to engage when the handle section is in normal up position, and a spring supported on the fulcrum section for urging said ball detent into holding position.

17. A collapsible shift-lock device comprising a shift key lever provided with a fulcrum bearing forward of its rear end and a shift key at its forward end, a key-operated shift lock pivotally held to said lever adjacent its forward end, one arm of said lever being divided into two sections, means forming a knuckle joint connection between the sections of said divided arm, the axis of said joint being parallel with the axial line of the fulcrum bearing, and a spring connected with the sections of the divided arm to resist breaking of the knuckle joint.

18. In a typewriting machine, the combination of a platen, a support for the platen shiftable to change case, a fixed stop, a stop moving with said support adapted to engage the fixed stop to arrest the support in upper case position, a shift key lever pivoted intermediate its ends and connected at its rear end with the support, one arm of said lever being divided into two sections, a horizontal pivot connecting the lever arm sections, means including a spring and a stop for yieldably holding the lever arm sections in normal position, a shift latch device carried by said lever, and a fixed locking abutment engageable by said latch, said spring being of sufficient force to yield only after engagement of the stop on the support with the fixed stop to afford a positive case shift movement of the support and a subsequent folding movement of the lever to permit engagement of the shift lock with said locking abutment, said lever being adapted to fold upon excessive back pressure on the support sufficient to permit movement of the support to lower case position.

19. An outer casing for an encased portable typewriting machine having a platen carriage shiftable upwardly to change case and a platen provided with finger wheels at its ends, comprising a cover section having top and side walls and front and rear walls, a pair of abutment devices within the cover adapted to engage behind the finger wheels when the cover is closed, abutment means within the cover adapted to engage the upper part of the platen and hold the platen and carriage in lower case position when the cover is closed, abutment means within the cover adapted to engage the upper side of a forward part of the machine frame when the cover is closed, a main frame base section, means carried by the base section for engaging within the lower part of the main frame of the machine when said frame part is fitted thereabout to hold the machine against lateral movement, said base section comprising a flat wall member with low edge flanges so that the machine may be operated while held on said base when the first mentioned case section is removed, a carrying handle held to the front wall of the cover section, and means for detachably connecting the cover with the base section.

20. In a typewriting machine, the combination of a main frame, a platen carriage and platen, a shift key lever carrying a shift key at its forward end, means pivotally supporting the shift key lever intermediate its ends to rock up and down, means connected with the rear end of the shift key lever for moving the platen carriage upwardly when the shift key is depressed, means for positively arresting the carriage in upper and lower case positions, a shift latch on the key-carrying end of the shift key lever, a shift lock abutment on the frame, said shift key lever having a knuckle joint therein between its fulcrum and said shift lock, and a heavy coil spring connected with said lever at opposite sides of said joint normally under sufficient tension to maintain the parts of said lever in fixed relation during case-shifting operations and adapted to yield under pressure on the forward part of said lever to permit engagement of the latch with the abutment after arrest of the carriage in upper case position and also adapted to yield under abnormal back pressure to allow the shift lever to fold sufficiently to permit forcing of the carriage and platen to normal case position while the shift latch remains engaged with said abutment.

21. In a typewriting machine, the combination of a main frame, a platen carriage and platen, a shift key lever carrying a shift key at its forward end, means pivotally supporting the shift key lever intermediate its ends to rock up and down, means connected with the rear end of the shift key lever for moving the platen carriage upwardly when the shift key is depressed, a shift lock for locking the key-carrying end of the shift key in depressed position, said shift key lever having a downwardly breaking knuckle-joint therein between its fulcrum and said shift lock, a heavy coil spring connected with said lever at opposite sides of said joint adapted to maintain the parts of said joint in normal relation during movement of the carriage and platen to upper case position and sustain the weight of the parts shifted by the lever and to yield under back pressure of an enclosing case member on a shifted part, an upper case stop, and a shift key lever stop for limiting downward movement of the key-carrying part of the shift lever.

22. In combination, a portable typewriting machine having a platen carriage shiftable to change case and a paper bail hinged to the carriage to swing upwardly and rearwardly above the platen to a release position, a base case section held to the bottom part of the machine frame, a cover case section having a hinge connection with the base section at the rear of the machine, yieldable means for holding the bail in release position, and means carried by the cover section for restoring the bail to normal position and holding the platen carriage in lower case position when the case is closed.

23. In a portable typewriting machine, the combination of a main frame, a base board held to the main frame, printing instrumentalities on the main frame, a carriage bed supported on the main frame, a platen carriage having a base member mounted on the bed to travel endwise transversely of the main frame and having end members provided with bearings for a platen shaft, a platen having a shaft journalled in said bearings, said end members having aligned apertures forming bearings for a margin stop bar, a rockable margin stop bar having trunnions at its ends extending through said apertures beyond the outer faces of the carriage end members, said bar having a notch therein intermediate its ends, a bracket rigidly held to the base member of the carriage having a part engaged in said notch to permit rocking of the stop bar but prevent endwise movement of the bar, manually operable means on the carriage engageable with the bed to arrest the carriage when the projecting ends of the stop bar trunnions are at predetermined points adjacent opposite sides of the main frame, a cover adapted to fit over the machine only when the carriage is arrested at said predetermined position and detachably connected with the base board, and a pair of transversely spaced abutment members on the cover adapted to engage the outer ends of the stop bar trunnions when the cover is placed over the machine to hold the carriage against endwise movement in either direction through the medium of said stop bar and bracket.

24. A portable typewriter having a traveling platen carriage and a margin stop bar held to the carriage against endwise movement relatively thereto, said stop bar being provided with end members projecting beyond the ends of the carriage for engagement with retaining means on an enclosing case to restrain endwise movements of the carriage.

25. In an encased portable typewriting machine having a platen shiftable to change case, a paper holding member shiftable to a release position away from the platen, and an outer casing comprising sections relatively shiftable to completely enclose the machine or to permit free operation of the machine, the combination of means carried by one of said sections for holding the platen in normal case position when the case is closed and for automatically shifting said paper holding member to normal position during movement thereof into holding relation with the platen if said section is shifted to effect enclosure of the machine while said paper holding member is in release position.

26. In a typewriting machine, the combination of a carriage support, a platen carriage mounted on said support to travel endwise transversely of the machine, a vertical pivot device on the carriage adjacent the left hand end thereof, a line spacing and carriage return lever having a rear fulcrum portion mounted on said pivot and a forwardly extending handle portion, a horizontal pivot connecting said portions of the lever to permit downward folding of the handle portion, means for locking the handle portion in normal substantially horizontal position, a lug on the handle portion adapted to engage a fixed part on the carriage to limit swinging of the lever toward the right relatively to the carriage and also to engage a fixed part on the carriage to limit downward folding of the handle portion.

27. The combination with a typewriting machine having a main frame and an obliquely shifting platen, of yieldable means for shifting the platen upwardly and rearwardly to upper case position and locking it there, a carrying case adapted to fit about said machine only when the platen is in lower case position, said case comprising a base and a separable cover, positioning and retaining means carried by the base engageable with the main frame, cooperating separable hinge members at the rear ends of the base and cover, cooperating locking members at the front ends of the base and cover, and means on the under side of the cover arranged to engage over the platen and hold it in lower case position when the cover is in closed position and to force the platen to lower case position during closing movement of the cover when said cover is closed with the platen locked in upper case position.

28. A portable typewriting machine having an outer protecting and carrying casing comprising two separably connected sections, one of said sections forming a machine cover and the other forming a supporting base upon which the machine is held in condition for operation when the cover section is removed, said machine having a platen roller and a margin stop bar mounted on the paper carriage thereof, and said cover having abutments therein engaging over the platen roller and a pair of abutments therein spaced apart longitudinally of the stop bar receiving the margin stop bar therebetween when the case is closed about the machine.

29. A portable typewriting machine having a traveling platen carriage, a case shift mechanism for shifting the platen carriage upwardly to change case, a platen roller having a shaft journalled in the carriage, finger wheels on the platen roller shaft, means for locating the carriage at a fixed point in its travel for encasing the machine, an outer case section adapted to support the machine in condition for operation, means for holding the main frame of the machine to said supporting case section, a second case section adapted to fit over the machine when the carriage is positioned by said locating means, means for separably holding the case sections together, means on the second case section engaging the upper portion of the platen roller when the said case section is placed over the machine, means on the second case section engaging behind the finger wheels when said case section is placed over the machine, and a carrying handle attached to the forward end of said second case section.

30. A portable typewriting machine having a traveling platen carriage, a case shift mechanism for shifting the platen carriage upwardly to change case, a platen roller having a shaft journalled in the carriage, finger wheels on the platen roller shaft, means for locating the carriage at a fixed point in its travel for encasing the machine, an outer case section adapted to support the machine in condition for operation, means for holding the main frame of the machine to said supporting case section, a second case section adapted to fit over the machine when the carriage is positioned by said locating means, means for separably holding the case sections together, means on the second case section engaging the upper portion of the platen roller when said case section is placed over the machine, means on the second case section engaging behind the finger wheels when said case section is placed over the machine, a margin stop bar on the carriage, a pair of abutments on the second case section positioned at opposite ends of said stop bar when the case section is placed over the machine, and a carrying handle for the machine attached to the forward end of the second case section.

31. In a typewriting machine, a collapsible line-space device operating handle movable downward from normal position to a more compact abnormal position by pressure of a machine cover, a platen carriage shiftable upwardly to change case, said line-space device operating handle being mounted on the carriage to shift therewith, and shift-lock means adapted to yieldably hold the platen carriage in elevated upper case position to permit forcing of the carriage to normal lower case position by pressure from a machine cover when the cover is placed over the machine with the shift lock means in locking position.

32. In a portable typewriting machine, a main frame, printing instrumentalities on the main frame, a platen carriage, an upwardly shiftable support for the carriage on the main frame, case-shift means for shifting said support upwardly and yieldably locking the support in its elevated position, a line-space lever on the carriage having a downwardly foldable handle section, means for yieldably locking said foldable lever section in normal elevated position, a platen roller having a shaft journalled on the carriage, positioning means for arresting the carriage in its travel in predetermined relation to the main frame, a combined supporting base and case section held to the main frame, a cover case section adapted to fit over the machine only when the carriage is positioned by the positioning means and abut said base only when the carriage is in lower case position and the line space lever is folded, means for locking the case sections in abutting relation, means carried by the cover section adapted to engage over the platen roller to hold the carriage in lower case position when the case sections are locked together and to force the roller and carriage to lower case position when said cover is forced down about the machine with the carriage locked in upper case position, said cover section adapted to engage and fold downward the handle part of the line-space lever when fitted over the machine.

33. In a portable typewriting machine, a main frame, printing instrumentalities on the main frame, a platen carriage, an upwardly shiftable support for the carriage on the main frame, case-shift means for shifting said support upwardly and yieldably locking the support in its elevated position, a line-space lever on the carriage having a downwardly foldable handle section, means for yieldably locking said foldable lever section in normal elevated position, a platen roller having a shaft journalled on the carriage, positioning means for arresting the carriage in its travel in predetermined relation to the main frame, a combined supporting base and case section held to the main frame, a cover case section adapted to fit over the machine only when the carriage is positioned by the positioning means and abut said base only when the carriage is in lower case position and the line space lever is folded, means for locking the case sections in abutting relation, means carried by the cover section adapted to engage over the platen roller to hold the carriage in lower case position when the case sections are locked together and to force the roller and carriage to lower case position when said cover is forced down about the machine with the carriage locked in upper case position, said cover section adapted to engage and fold downward the handle part of the line-space lever when fitted over the machine, and means held to the cover and positioned at opposite ends of the carriage when the cover is in place to prevent travel of the carriage in both directions.

34. In a portable typewriting machine, a main frame, printing instrumentalities on the main frame, a platen carriage, an upwardly shiftable support for the carriage on the main frame, case-shift means for shifting said support upwardly and yieldably locking the support in its elevated position, a line-space lever on the carriage having a downwardly foldable handle section, means for yieldably locking said foldable lever section in normal elevated position, a platen roller having a shaft journalled on the carriage, positioning means for arresting the carriage in its travel in predetermined relation to the main frame, a combined supporting base and case section held to the main frame, a cover case section adapted to fit over the machine only when the carriage is positioned by the positioning means and abut said base only when the carriage is in lower case position and the line space lever is folded, means for locking the case sections in abutting relation, means carried by the cover section adapted to engage over the platen roller to hold the carriage in lower case position when the case sections are locked together and to force the roller and carriage to lower case position when said cover is forced down about the machine with the carriage locked in upper case position, said cover section adapted to engage and fold downward the handle part of the line-space lever when fitted over the machine, means held to the cover and poistioned at opposite ends of the carriage when the cover is in place to prevent travel of the carriage in both directions, finger wheels on the platen roller shaft, means carried by the cover adapted to engage behind the finger wheels when the cover is in place, and a carrying handle attached to the forward end of the cover.

35. In a portable typewriting machine, an upwardly shiftable platen carriage, a platen journalled on the carriage, line spacing mechanism for the platen and case-shifting and lock-up mechanism for the carriage both collapsible by downward pressure transmitted from a case cover, and a margin stop bar held to the carriage against endwise movement and having end portions projecting beyond the ends of the carriage for abutment against carriage-travel-preventing abutments on a case cover.

36. The combination of a typewriting machine having a main frame and a platen adjacent the rear of the frame shiftable upwardly to change case; rubber supporting feet held to the main frame adjacent both the front and rear of said frame; a rigid base; holding means carried by the base with which the frame is separably engaged to hold the frame against shifting parallel with the base with the rubber feet resting on the upper face of the base, said main frame being rockable relatively to the base into and out of holding engagement with said holding means; a rigid cover fitting over the machine and cooperating with the base to form a carrying case for the machine; means for separably locking the cover to the base; and cushion devices carried by the cover engaging respectively over the upper part of the platen and over a forward part of the main frame to hold the rubber feet pressed against the upper face of the base in all positions of the carrying case.

37. A main frame base for typewriting machines, comprising a supporting member having flat top and bottom faces; an upstanding forwardly facing hook held to the supporting member adjacent the forward edge thereof to receive a machine frame part; and a pair of transversely aligned yieldable sheet metal friction gripping members adjacent the rear edge of said supporting member, each having a horizontal part secured to the upper face of the supporting member and an upstanding flat friction gripping part having the upper end thereof bent forwardly and upwardly to guide a machine frame part downward in rear thereof into light frictional contact with the rear faces of the upstanding friction gripping portions and draw the machine frame part cooperating with the hook rearward into the throat of the hook into firm engagement with the hook.

38. In a portable typewriting machine, a main frame; a platen carriage mounted to travel transversely of the main frame; a platen on the carriage; a pair of ribbon spools supported in front of and closely adjacent the platen at opposite sides of the main frame; a line space lever having a fulcrum section pivoted on the carriage adjacent one end of the carriage to swing transversely of the machine, said lever having a handle section extending forward from the fulcrum section beyond the vertical transverse plane of the rear sides of the ribbon spools at a level closely above the level of said spools and carrying at its forward end an integral finger piece extending upward to a level higher than the platen and remaining parts of the machine; means for positioning the carriage over the main frame preparatory to enclosing the machine in a carrying case at a point in its travel at which the handle section of the line space lever lies in a vertical fore and aft plane adjacent the outer side of one of the ribbon spools, said handle section being hinged to the fulcrum section to fold downward about an axis extending transversely of the machine to a position opposite the outer side of the adjacent ribbon spool when the carriage is positioned by said positioning means; and means for sustaining the handle section in its unfolded elevated position of use and adapted to permit folding of the handle section upon the exertion of downward pressure on said section.

39. In a portable typewriting machine, a traveling platen carriage; letter-feed mechanism therefor; a platen on the carriage; a pair of ribbon spools in front of the platen at opposite sides of the machine; a line space lever having a fulcrum section pivoted on the carriage to swing transversely of the machine, and a handle section normally arranged to travel over one of the spools and provided with a finger piece extending upward to a level higher than the top of the platen, said handle section being hinged to the fulcrum section to fold about an axis extending transversely of the machine to a position opposite and close to the outer side of the spool over which it travels when the machine is conditioned for enclosure within a carrying case; and means for releasing the carriage from its feed mechanism and arresting it at a predetermined fixed point in its travel at which the handle section of the line space lever is in a vertical fore and aft plane closely adjacent the outer side of said last-mentioned spool to condition the machine for enclosure within its case.

40. A portable typewriting machine comprising a main frame supporting the working parts of the machine; cushion feet held to the main frame adjacent the front and rear of the frame; a cover member adapted to fit over the machine; a base member adapted to support the machine for use when the cover is removed; upstanding abutment means on the base member adapted to contact surface portions of the main frame facing laterally in opposite directions upon downward placement of said frame into engagement with said means with the bottoms of the cushion feet abutting the upper face of the base member; means for detachably holding the cover member to the base member against relative movement in all directions; and cushion means carried by the cover member in position to engage over parts of the machine adjacent both the front and rear of the machine when the cover member is attached to the base member and exert pressure on said machine parts toward the base member to hold the cushion feet firmly pressed against the base member and to cooperate with said feet to absorb up and down shocks.

41. An encased portable typewriting machine having a main frame supporting its working parts; a combined supporting base and carrying case section underlying the main frame and adapted to support the machine in condition for use; abutment means on said base projecting upward within the main frame and releasably holding said frame against lateral movement in all directions relatively to the base by contact engagement between the abutment means and laterally facing portions of the frame upon placement of the machine on the base; a cover case section; means for detachably holding the cover section to the base to enclose the main frame and working parts of the machine; abutment devices adjacent opposite sides of the cover section for receiving the carriage of the machine therebetween and holding it against endwise travel in both directions while the cover section is in place; and abutment means on the cover section for contacting the machine and pressing it against the base when the cover is in place.

42. In combination, a typewriting machine having a platen shiftable to change case and a shift lock for holding the platen in upper-case position; and an enclosing case for the machine, said case having means therein for engaging said shiftable platen to hold the same in lower-case position when the case is closed, and said machine having platen shifting means comprising a part with which said lock cooperates to hold the platen in upper-case position and a part adapted to yield under pressure upon the platen of said platen-engaging means in the case to permit the platen to be moved to and held in lower-case position by said platen-engaging means upon closure of the case with the shift lock in locking position.

43. In a portable typewriting machine, a platen carriage; a collapsible line-space lever comprising a fulcrum section pivoted on the carriage to swing transversely of the machine about a vertical axis and a handle section extending forward from the fulcrum section and formed with an integral upstanding finger piece at its forward end extending higher than the remaining parts of the machine when the lever is in condition for use; means pivotally connecting the adjacent ends of said lever sections to permit folding and unfolding movements of the handle section about an axis extending transversely of the machine; means for limiting upward and downward unfolding movements of the handle section to determine the position thereof for use; and a spring-pressed latch carried by one lever section, the other lever section being formed with a socket in which the latch is adapted to be automatically projected at the upward limit of movement of the handle section for holding the handle section in unfolded position, said latch being shaped for camming thereof out of said socket by downward pressure on said handle section and the lever section formed with the socket having a surface adjacent the socket against which the latch is projected while out of said socket.

44. In a portable typewriting machine, a platen carriage; a collapsible line-space lever comprising a fulcrum section pivoted on the carriage to swing about a vertical axis and a handle section extending forwardly from the fulcrum section and having an upstanding finger piece at its forward end extending higher than the remaining parts of the machine when the lever is in condition for use; means pivotally connecting the adjacent ends of the lever sections to permit up and down unfolding and folding movements of the handle section about an axis extending transversely of the machine; a stop carried by the fulcrum section for limiting upward unfolding movement of the handle section to determine the position of use thereof; a stop carried by the fulcrum section for arresting downward folding movement of the handle section with the top of the finger piece approximately level with the highest remaining part of the machine; and a spring-pressed latch device for holding the handle section in its uppermost position and releasable by downward pressure on the handle section.

45. An outer casing for portable typewriting machines having transversely extending front and rear main frame parts comprising a flat main frame base having low edge flanges; upstanding means held to the base in position to cooperate with the rear edge flange to form a friction gripping means for receiving the rear transversely extending frame part of the machine; an upstanding hook carried by the frame base adjacent the front edge flange thereof for engaging with the front transversely extending frame part of the machine to position the machine frame for downward rocking of said rear frame part into engagement with the friction gripping means and also to cooperate with the front frame part to assist the gripping means to releasably hold the machine frame on the base; a cover having a top wall and four side walls; means for separably holding the cover to the case; and means on the cover for engaging over a part of the machine adjacent the rear thereof to hold the machine against upward and forward rocking movement away from the base.

46. An outer casing for portable typewriting machines having transversely extending front and rear main frame parts, comprising a flat main frame base having low edge flanges; upstanding means held to the base in position to cooperate with the rear edge flange to form a friction gripping means for receiving the rear transversely extending frame part of the machine; an upstanding member held to the base in position for abutment thereagainst of the front transversely extending frame part of the machine; a cover having a top wall and four side walls; means for detachably holding the cover to the base; means on the inner face of the top wall of the cover adjacent the rear end of the casing for engaging over the upper part of the platen of the machine; and means on the inner side of the front side wall of the cover for engaging the top surface of the front transversely extending frame part of the machine.

47. In a portable typewriting machine, a main frame; a traveling platen carriage; a two-part collapsible line-spacing lever having a finger piece depressible from an elevated position of use to a more compact lower inoperative position to condition the machine for enclosure in a carrying case; means pivotally holding the lever to the carriage to swing laterally as a unit upon pressure on the finger piece transversely of the machine; a hinge joint in the lever arranged with its axis perpendicular to the pivotal axis of the lever to permit downward folding of the finger piece to its inoperative position by downward pressure on the finger piece; and a spring-pressed detent carried by one part of the lever for latching the finger piece in its operative position against accidental folding, the other part of the lever having a socket in which said detent is adapted to be projected upon elevation of the finger piece to its position of use and having a surface portion engaged by the detent while out of said socket, the detent being shaped for camming thereof out of the socket by exertion of downward pressure on the lever sufficient to overcome the spring pressure on the detent.

In testimony whereof I hereunto affix my signature.

ALONZO B. ELY.